Oct. 20, 1925.
I. M. LADDON ET AL
HYDRAULIC SHOCK ABSORBER
Filed June 27, 1923
1,557,849
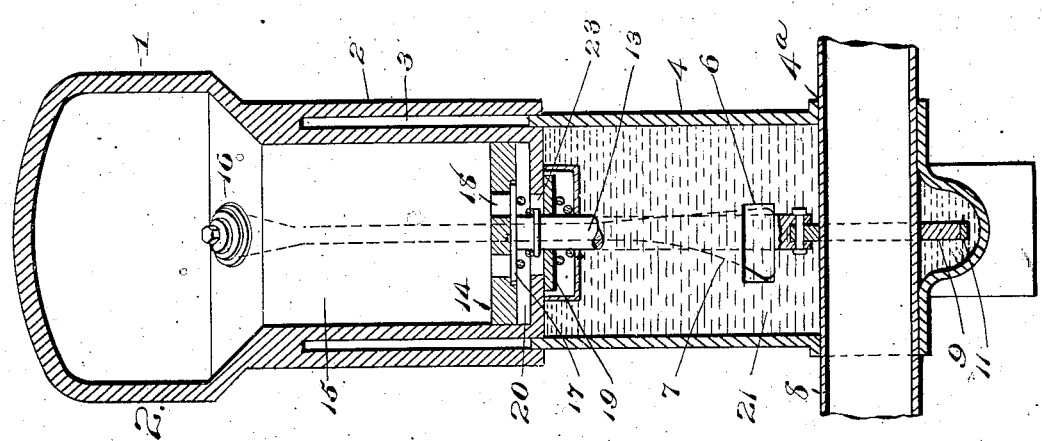
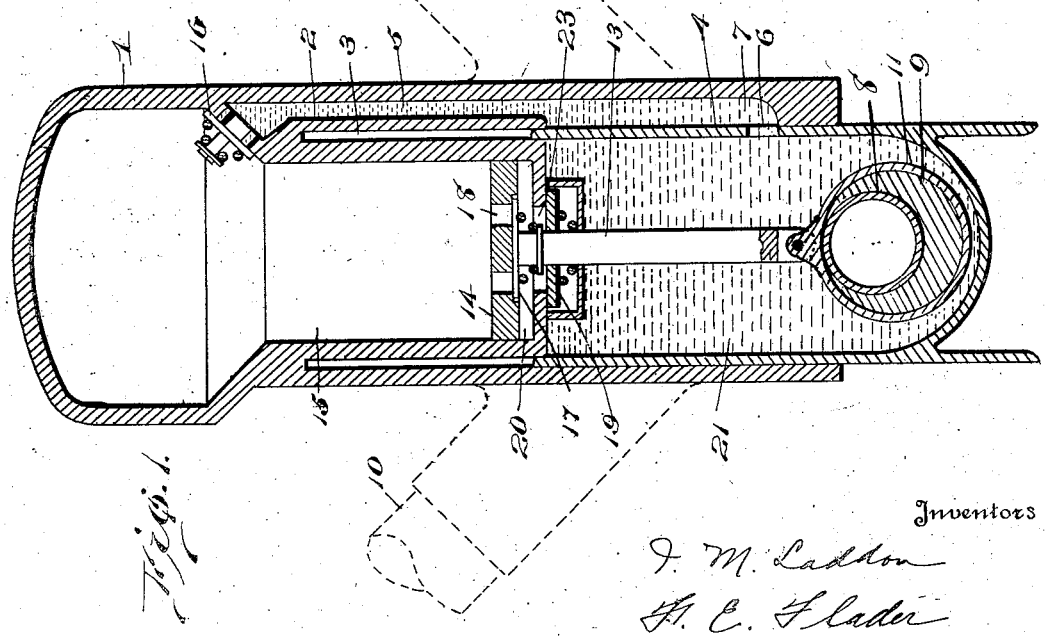

Patented Oct. 20, 1925.

1,557,849

UNITED STATES PATENT OFFICE.

ISAAC MACKLIN LADDON AND FREDERIC E. FLADER, OF DAYTON, OHIO.

HYDRAULIC SHOCK ABSORBER.

Application filed June 27, 1923. Serial No. 648,022.

*To all whom it may concern:*

Be it known that we, ISAAC M. LADDON and FREDERIC E. FLADER, citizens of the United States, residing at Dayton, in the county of Montgomery and State of Ohio, have invented certain new and useful Improvements in Hydraulic Shock Absorbers, of which the following is a specification.

This invention relates in general to shock absorbing means for use on vehicles and more particularly concerns the provision of hydraulic shock absorbing means for use on airplanes.

We are aware it is not new in the art to provide hydraulic shock absorbers for aircraft. It has been proposed to use a hydraulic shock absorber embodying the principle of a dash pot for relieving the initial shock of landing. As far as we are aware, however, there has been no adequate provision made for returning the shock absorbing means to its operative position after the shock has been absorbed.

It is an object of our invention to provide a hydraulic shock absorber which utilizes the principle of the dash pot in absorbing the shock or shocks of landing and to so adapt our device that the rotation of the axle of the landing gear of such an aircraft is used as a means for providing motion to elements for restoring the shock absorbing device to its operative position, that is, to such a position that it will be ready to receive and absorb further shocks.

Other objects of our invention will appear in the accompanying specifications and claims and will be disclosed in the accompanying drawings in which;

Figure 1 is a side elevation largely in central vertical section of my device.

Figure 2 is a central vertical section taken at right angles to the view shown in Figure 1.

Referring with greater particularity to the drawings, it will be seen that we have provided a cylinder 1 rigidly secured to the landing gear chassis 10 having a lower skirt portion 2, in which there is provided an annular channel or guideway 3 in which a cylinder sleeve 4 is adapted to be reciprocated. The cylinder 1 is provided on its right hand side as viewed in Figure 1 with a fluid passageway 5, the purpose of which will be hereinafter described. A port 6 in the sleeve 4 is adapted to communicate with the passageway 5 through the tapered slot 7 in the inner wall of the cylinder 1.

The sleeve 4 is mounted at 4ª upon the axle 8 of the airplane, suitable means for making this bearing fluid-tight being provided. A piston 14 fixedly secured to a piston rod 13, which in turn is secured to a ring 11, is eccentrically mounted on axle 8 by means of an eccentric or cam 9 rotating with the axle. The piston 14 is adapted to reciprocate in the bore 15 of the cylinder 1, having a fluid tight fit therein. An outlet valve 16 is provided for the passageway 5, this valve being spring-seated, the tension of the spring being in excess of that required to support the weight of the airplane. The piston 14 is provided with passageways 18 and a downwardly opening spring-seated valve 17. The lower end of the inner bore of the cylinder 1 is turned inwardly, and ports 23 normally closed by a spring-seated downwardly opening valve 19 are thus provided. Between the piston 14 and the inwardly turned lower end of the cylinder 1, there is thus left a chamber 20.

It is to be understood that we do not intend that our invention shall be limited to the specific structure shown in the drawings but limited only by the broad ideas to which we are entitled and as included in the claims.

From the foregoing, our device will be seen to operate as follows:

The axle of our aircraft being fixedly secured to the sleeve 4, there can be no relative motion between said axle and said sleeve to take up the shock in landing. The airplane being attached to the cylinder 1 there will, upon landing, necessarily be a relative motion between the cylinder 1 and the sleeve 4 with the result that the fluid in the fluid chamber as shown at 21, will be forced outwardly through the port 6, tapered slot 7, passageway 5, valve 16, and into the interior of the cylinder 1. Due to the taper in the slot 7, a gradually increasing resistance will be offered to the relative motion. The airplane then being on the ground the axle 8 will rotate, the eccentric 9 causing a reciprocatory motion of the piston 14 in the bore 15 of the cylinder 1. On the upstroke of the piston the valve 17 will be forced open and the oil above the piston will be forced downwardly into the chamber 20. On the downstroke of the piston, the valve 17 will close and the valve 19 open, the oil in chamber 20 thus being forced out into the interior 21 of the sleeve 4. Since the sleeve will be filled with oil, the downward motion of the piston will force the cylinder 1 upwardly along the sleeve 4 until the two parts are in the same relative position that they occupied before receiving the impact of landing. As before described, the spring seated valve 16 is of a tension in excess of that required to balance the weight of the plane so that whenever any shock considerably greater than the weight of the plane is encountered, the valve 16 will open, permitting the fluid to pass through the passageway 5.

We claim:

1. In a shock absorbing means for use on vehicles, a dashpot shock absorber and means for restoring said shock absorber to its operative position after the shock has been absorbed.

2. In a shock absorbing means for use on vehicles, a dashpot shock absorber and means operated by the motion of the vehicle for restoring said shock absorber to its operative position after the shock has been absorbed.

3. In a shock absorbing means for use on vehicles, a dashpot shock absorber and means operated by the motion of the vehicle for restoring said shock absorber to its operative position after the shock has been absorbed, said last named means offering a brake effect to the motion of said vehicle.

4. In a shock absorber for airplanes, hydraulic shock absorbing means to absorb the shock of landing, and means operated by the rotation of the airplane axle to return said shock absorbing means to its operative position after the shock has been absorbed.

5. In a shock absorbing device for use on aircraft, a cylinder fixedly secured to the landing gear chassis of said aircraft, a cylindrical fluid containing sleeve adapted to be reciprocated in an annular guideway in said cylinder, said sleeve being mounted on the axle of said aircraft in such a manner as to permit rotation of said axle, a fluid passageway in said cylinder, a port in said sleeve adapted to communicate with said passageway, a spring seated valve in said passageway, a piston eccentrically mounted on said axle, valve means between said sleeve and said cylinder, and valve means in said piston.

6. In a shock absorbing device for use on aircraft, a cylinder fixedly secured to the landing gear chassis of said aircraft, a cylindrical fluid containing sleeve adapted to be reciprocated in an annular guideway in said cylinder, said sleeve being mounted on the axle of said aircraft in such a manner as to permit rotation of said axle, a fluid passageway in said cylinder, a port in said sleeve adapted to communicate with said passageway through a tapered slot therein, a spring seated outlet valve in said passageway, a piston eccentrically mounted on said axle, valve means between said sleeve and said cylinder, and valve means in said piston.

7. In a hydraulic shock absorber for vehicles, a cylinder adapted to be secured to the undercarriage of said vehicle, an annular cylindrical guideway and a cylindrical bore in said cylinder, a fluid containing member mounted on the axle of said vehicle and having a sleeve adapted to reciprocate in said guideway, a piston in said fluid containing member and eccentrically mounted on said axle, and valve means in said piston and said cylinder.

8. In an absorber for use on aircraft having a landing gear including a rotary member, a pair of relatively movable shock absorbing members, and means operable by the rotary member of the landing gear for returning the shock absorbing members to their operative position after the shock has been absorbed.

In testimony whereof we affix our signatures.

ISAAC MACKLIN LADDON.
FREDERIC E. FLADER.